Nov. 26, 1968 R. N. FREEMAN, SR 3,413,155
GLOW ENGINE STARTER
Original Filed April 1, 1965
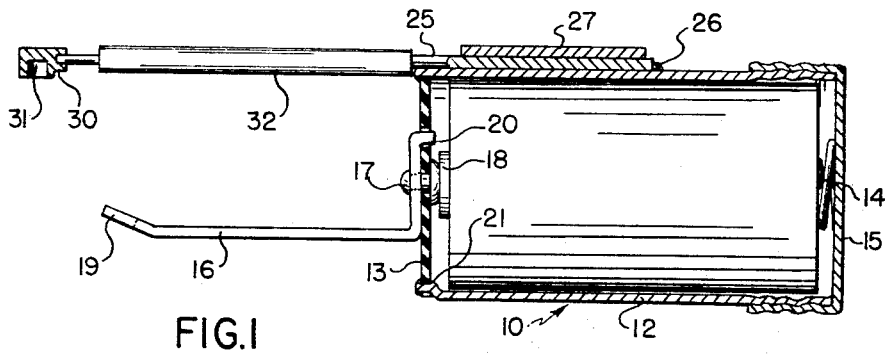
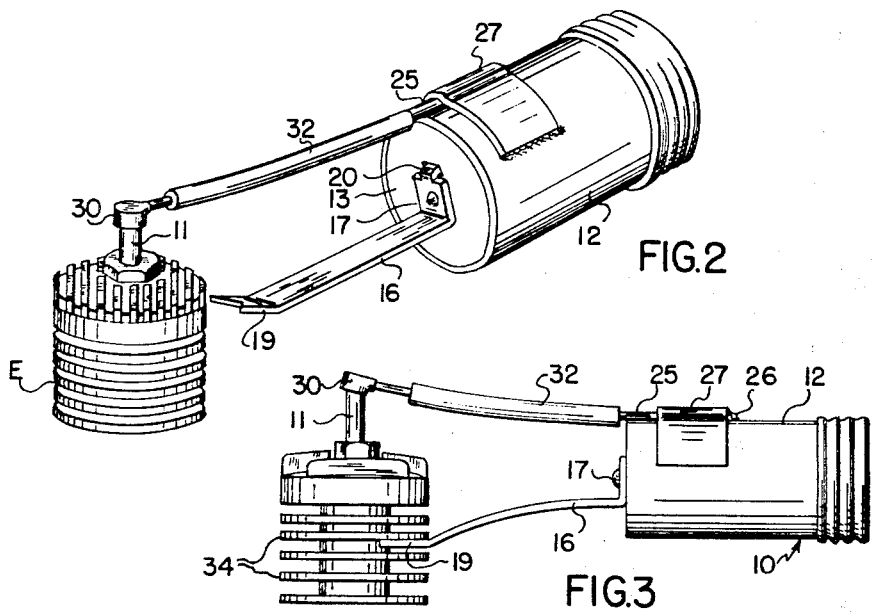
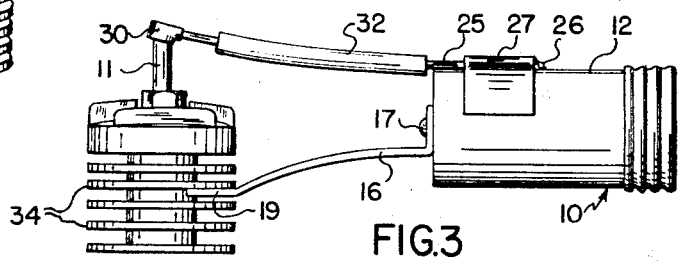
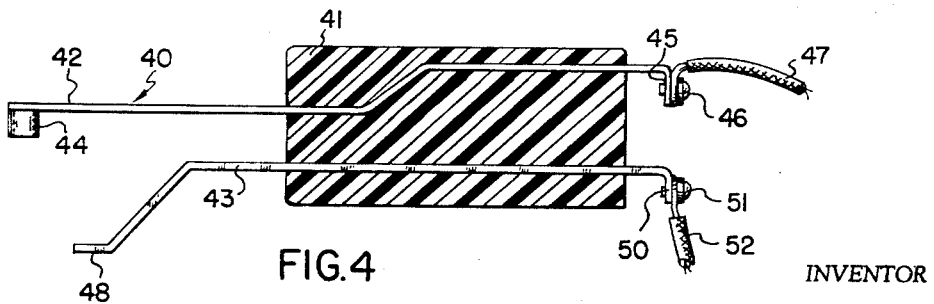
INVENTOR
RICHARD N. FREEMAN, SR
BY *Hoffmann and Yount*
ATTORNEY

United States Patent Office 3,413,155
Patented Nov. 26, 1968

3,413,155
GLOW ENGINE STARTER
Richard N. Freeman, Sr., Eisenhower Drive, R.D. 3,
Willoughby, Ohio 44094
Continuation of application Ser. No. 444,761, Apr. 1,
1965. This application Oct. 6, 1967, Ser. No. 674,075
7 Claims. (Cl. 136—173)

ABSTRACT OF THE DISCLOSURE

A device for connecting the glow plug of a model airplane engine in circuit with a battery where a handle-like member has an electrical conductor extending therefrom and having a hole in the end adapted to receive the end of the glow plug such that the device can be electrically connected to the engine.

---

This application is a continuation of copending application No. 444,761, filed Apr. 1, 1965, which is now abandoned.

The present invention relates to devices for temporarily connecting the plug of a glow plug type model airplane engine in a battery circuit to energize the plug for starting the engine.

Model airplane engines of the glow plug type are started by energizing the plug by a battery until combustion in the engine heats the plug to a degree to sustain engine firing after which the plug is disconnected from the battery circuit; accordingly it is desirable that the device for connecting the plug with the battery circuit be easily and conveniently attached to the engine and plug preferably in a self-supporting manner and after the engine is started can be readily and quickly detached from the engine.

A principal object of the invention is the provision of a novel and improved model airplane engine starter for temporarily connecting the glow plug of a model airplane engine in a battery circuit and which is formed of a relatively few, simple, inexpensive parts assembled in a unit devoid of relatively movable pivoted operating elements and which may be easily manipulated to attach and detach battery circuit terminals to an engine and its glow plug. The invention is particularly suitable for use in a portable, self-contained glow plug engine starter in which the battery is carried in handle means for manipulating the starter to connect and disconnect it from the plug.

A further object of the invention is the provision of a novel and improved starter of the type mentioned comprising a small portable handle means having preferably, two elongated, generally parallel extending stiff but resilient conductor means or contact members supported in cantilever fashion therefrom so that the outer ends thereof are normally maintained separated a predetermined distance and which can be yieldingly spread apart by placing one end of one contact member against the tip of the glow plug and manipulating the handle means to press the end of the contact member to the plug and thereby deflect the positioned contact member while moving the end of the other contact member between two cooling fins of the engine with the ends of the contact members separated beyond their normal spacing so that the tendency of the contact members to return to their normal predetermined spaced position provides a grip which assists in maintaining the starter in circuit making connection with the engine and plug, and which starter can be disconnected from the engine and plug by simply withdrawing it from the engine. Preferably, the end of the contact member which engages the plug has a recess or hole which receives the plug tip to anchor the contact member against lateral displacement from the plug.

In a preferred form of the invention, the handle means for the two contact members serve as a battery holder and the contact members are fixedly attached at one end to the handle or handle means so as to form opposite terminal connections for a battery carried in the handle means thereby providing a compact self-contained engine starter unit which is easily manipulated for attachment to and detachment from a model engine during starting thereof.

Other objects and advantages of the invention will be apparent from the following description of preferred embodiments of the invention, reference being made to the accompanying drawings wherein:

FIGURE 1 is a side view, partly in section, of a self-contained portable glow plug-type engine starter embodying the invention;

FIGURE 2 is a perspective view of a portion of a glow plug type engine showing the initial step in the application of the engine starter shown in FIG. 1 thereto;

FIGURE 3 is a side elevational view of the starter connected to the glow plug and engine; and FIGURE 4 is a side view, partly in sections showing a second form of a glow plug engine starter embodying the invention for attaching the glow plug of an engine to a remotely located battery.

Referring to FIGURES 1 through 3, a portable engine starter is shown at 10 for connecting the glow plug 11 of a model airplane engine E in a circuit of a separate battery or battery unit B for energizing the filament of the glow plug so that the engine may be started. In the form of the invention shown, the starter comprises a cylindrical handle-like holder or battery case 12 which is preferably formed of a metallic cylinder, such as brass, having one end closed by a wall 13 which is formed of a suitable dielectric material. A separate battery B is removably contained in case 12 and is urged toward wall 13 by a spring 14 between one end of the battery and a metal cap 15 threaded on the open end of the cylinder through which the battery is loaded into the case. The battery may be of any suitable type for energizing glow plugs, and the battery shown is an Eveready No. N57 nickel-cadmium rechargeable type having a high rate capacity of 1.25 volts and 4 amperes. It will be seen that case 12 provides a convenient handle for manipulation of the engine starter.

An L-shaped tongue like conductor or contact member 16 is secured to end wall 13 by a brass rivet 17 which extends into case 12 and provides a contact engaged by the end terminal 18 of battery B which is maintained in firm contact with the rivet by force of the spring 14. Contact member 16 projects in an axial direction from the end of case 12 and terminates in an upwardly turned or bent plate-like portion 19 the end edge of which is preferably notched, as shown. Contact member 16 is preferably formed of a relatively stiff strip of metal, such as brass, beryllium copper or Phosphor bronze, and its temper is such that it can be flexed laterally and returned to its normal position seen in FIGURE 1. Rotation of the member 16 relative to the member 13 is prevented in addition to the rivet 17 by projection of a portion 20 thereof in a small aperture in the member 13 and rotation of the member 13 in the case 12 is prevented by one or more longitudinal depressions 21 in the case 12 which engage in suitable slots in the member 13 and in effect key the parts together.

A second conductor or contact member 25 is soldered at 26, or otherwise suitably secured, to one side of case 12 and projects axially of the case and parallel to contact 16. In the embodiment shown the member 25 is soldered to the case 12 and the joint between the parts is strengthened by a metal strap 27 overlying the end of the member 25 soldered thereto and to the case 12. Contact 25 is also stiff and flexible, preferably formed of a hard steel wire, although a strip form similar to conductor 16 could be employed. The outer end of the member 25 has a member 30 suitably fixed thereto which includes a recess 31 facing toward contact 16, adapted to receive the tip of the glow plug 11 and prevent lateral movement of the contact from the plug.

The projecting ends of contact members 16, 25 are normally spaced apart a suitably predetermined distance by their inherent rigidity so that they are not apt to touch one another and short circuit the battery and yet they can be flexed outwardly with respect to one another, the purpose of which will appear hereinafter. The contact member 16 is electrically connected to terminal 18 of the battery by the rivet 17, and the contact 25 is connected to the other terminal of the battery through the wall of case 12, cap 15 and the spring 14, which bears on the terminal of the battery at the right hand end thereof, as seen in FIGURE 1. Preferably, a sleeve of insulating material 32 surrounds the major section of contact member 25 extending from the case to minimize the likelihood of a short circuit inadvertently occurring between the two members 16 and 25. Alternatively, either one or both of the contact members 16 and 25 could be covered with insulation for this purpose, if desired. It will be appreciated that the glow plug can be operatively connected to the circuit of battery B merely by placing contact member 25 on the tip of the plug 11 and contact member 16 against the side of the engine beneath the plug.

In connecting the circuit of battery B to the glow plug 11 and engine E the member 30 on the projecting end of contact member 25 is placed over the tip of glow plug 11 with the case 12 positioned so that contact 16 is tilted away from the engine, as seen in FIGURE 2. Case 12 is then manipulated to press contact member 30 firmly to the plug and the resulting flexing of the member 25 brings end 19 of contact member 16 into position for insertion between two adjacent cooling fins 34 of the engine, as seen in FIGURES 2 and 3. The notched end of contact 16 receives a portion of the engine cylinder so that the end of member 16 engages an appreciable area of the fin. After contact 16 is inserted between the fins of engine E, case 12 may be released by the operator if desired, and the starter will be supported in circuit connecting position by the bracing action of contact 16 and the retention of contact 25 on the tip of plug 11 by the member 30. The inherent resilient force of the two contact members 16, 25 tending to resume their normal minimum space positions provides a clamping action of the contacts between the outer end of glow plug 11 and the fin beneath which contact 16 is lodged to assist in maintaining case 12 and its battery in the self-supporting position described so that the operator may have both hands free to work with the engine.

The attachment of the starter 10 to the plug and engine as just described results in, as is well understood, the filament of the glow plug becoming heated to ignite the fuel drawn into the cylinder. After the engine has started, the combustion therein heats the plug filament, and the energizing circuit of battery B is no longer required at which time the casing 12 and the contacts carried thereby are easily removed merely by tilting the case upwardly to withdraw contact 16 from the engine and raise contact 25 from the plug.

It will be seen that an inexpensive, completely self-contained portable model airplane engine starter is provided which has no interengaging and relatively moving pivoted parts and which can be attached to and detached from the plug and engine by simple manipulations of the handle forming the battery holder.

Another form of the invention is embodied in an engine starter shown at 40 in FIGURE 4 which is connected with the starter battery through wire leads. In this form of starter, a handle means 41 is formed of a block of suitable molded plastic or like insulating material in which the central portions of two elongated conductor or contact members 42 and 43 are rigidly embedded with one member above the other and the members extending generally parallel. Both contact members are formed of a spring strip of metal so that the strips can be flexed laterally and when released return normally to a spaced position as seen in FIGURE 4. The upper member 42 has a collar 44 at one end providing an inwardly facing recess for receiving the tip of the glow plug 11 to prevent lateral movement of the contact from the plug. The other end of contact member 42 has a downwardly turned portion 45 into which a screw 46 is threaded for securing a wire 47 thereto leading to one terminal of a suitable battery, not shown, for energizing a glow plug.

Contact member 43 is formed of strip material similar to that of member 42 and has a spade like end portion 48 offset from the plane of the major portion of the member, the end edge being notched so as to receive a portion of the engine cylinder therein. The opposite end of contact member 43 has a terminal arrangement similar to that of member 42 including a terminal portion 50 having a screw 51 threaded therein for attaching a wire 52 thereto leading to the other terminal of the starting battery.

In attaching the starter 30 to a glow type engine, member 41 is grasped in the fingers and contact member 42 is placed on the glow plug with the tip of the plug received in collar 44 and the contact is then depressed, as in the case described with reference to contact 25, to bring the end of contact 48 to a position to be inserted between the fins of the engine in the manner described with reference to starter 10 so that the starter is supported by the bracing action of contact 42 and the contact 43, the frame of which is anchored to the plug and assisted by the resilient gripping action occurring between the spread contacts on the plug and engine. When it is desired to disconnect the glow plug it is merely necessary to remove the starter by an upward and withdrawal motion.

The form of starter just described is exceedingly inexpensive to manufacture, has no rotating or movable engaging parts and yet it provides an effective, easily manipulated connector for attaching the glow plug with a battery circuit through terminal wires leading to a remote battery.

It will be apparent that although I have described but two forms of the invention, other forms, modifications, and adaptations thereof could be made, all falling within the scope of the claims which follow.

What I claim:

1. In a device for connecting the glow plug of a model airplane engine having cooling fins on the cylinder thereof in an electric battery circuit, an elongated rigid handle-like holder adapted for receiving a separate complete battery unit therein, means for retaining a separate electric battery unit in said holder, two elongated electrical conductor means, both of said electrical conductor means being stiff and at least one being resilient, means rigidly connecting one end of each of said conductor means to said holder with said conductor means insulated from one another and extending generally parallel with one another from one end of said holder and with their extending ends normally spaced apart a predetermined distance, the extended end of one of said conductor means having a recess for receiving the tip of a glow plug and the extended end of the other of said conductor means being adapted for insertion between the fins of the engine, means adapted to form an electrical connection between one terminal of a battery in said holder and one of said conductor means and means adapted for forming an electrical connection between the other terminal of a battery in said holder and the other of said conductor means.

2. A device for connecting the glow plug of a model airplane engine in an electric battery circuit as claimed in claim 1 wherein the extended end of said other of said conductor means is plate-like in form.

3. In a device for connecting the glow plug of a model airplane engine having cooling fins on the cylinder thereof in an electric battery circuit, an elongated rigid handle-like holder adapted for receiving a separate complete battery unit and retain the battery unit therein, at least one stiff elongated electrical conductor means being integral with said holder and extending therefrom generally parallel with the length of said holder, means adapted to form an electrical connection between one terminal of a battery unit in said holder and said conductor means, and means for detachably connecting said conductor means to the tip of a glow plug.

4. A device for connecting the glow plug of a model airplane engine in an electric battery circuit as claimed in claim 3 wherein said means for detachably connecting said conductor to the tip of the glow plug is a hole in the end of the conductor for the reception of the tip of the glow plug.

5. In a device for connecting the glow plug of a model airplane engine having cooling fins on the cylinder thereof in an electric battery circuit, an elongated rigid handle-like member, two elongated electrical conductor means, both of said electrical conductor means being stiff and at least one being resilient, means rigidly connecting said conductor means to said handle-like member with said conductor means insulated from one another and extending generally parallel with one another from one end of said handle-like member and with their extending ends normally spaced apart a predetermined distance, means adapted to form an electrical connection between one terminal of a battery and one of said conductor means, means adapted for forming an electrical connection between the other terminal of a battery and the other of said conductor means, the extended end of one of said conductor means being adapted for insertion between the fins of the engine and the extended end of the other of said conductor means including means for receiving the tip of the glow plug of the engine.

6. A device for connecting the glow plug of a model airplane engine in an electric battery circuit as claimed in claim 5 where said means for receiving the tip of the glow plug in the extended end of the other of said conductor means is a recess formed by a tubular-like protrusion on the extended end of said other of said conductor means.

7. In a device for connecting the glow plug of a model airplane engine having cooling fins on the cylinder thereof in an electric battery circuit, an electric battery unit having a pair of spaced terminals, battery holder means having a cylindrical portion for removably receiving said battery unit, a pair of electrical conductors secured to said battery holder means and electrically insulated from each other, one of said conductors being connected to one of said battery terminals and the other of said conductors being connected to the other of said battery terminals and at least one of said conductors being elongated and projecting from said cylindrical portion of the battery holder means generally parallel to the axis thereof, said elongated conductor having a hole for receiving the tip of the glow plug of the engine and means on said other conductor for engaging the side of the engine to operatively connect the glow plug and the battery circuit while simultaneously bracing the battery unit and battery holder means against the side of the engine.

References Cited

UNITED STATES PATENTS

| | | | |
|---|---|---|---|
| 3,336,165 | 8/1967 | Brownlee | 136—173 |
| 1,439,430 | 12/1922 | Lyhne | 136—173 |
| 2,636,971 | 4/1953 | Delbrook | 339—108 XR |
| 2,869,096 | 1/1959 | Miller | 339—110 XR |
| 2,879,316 | 3/1959 | Enikeieff | 136—173 |
| 2,915,732 | 12/1959 | Pifer | 339—62 XR |
| 2,928,067 | 3/1960 | Broberg et al. | 339—108 XR |
| 2,990,496 | 6/1961 | Sullivan | 339—255 XR |

WINSTON A. DOUGLAS, *Primary Examiner.*

D. L. WALTON, *Assistant Examiner.*